United States Patent [19]

Isaac

[11] 3,912,716

[45] *Oct. 14, 1975

[54] PROCESS FOR THE RECOVERY OF PURE HELLEBRIN

[75] Inventor: Otto Isaac, Bruchkobel, Germany

[73] Assignee: Deutsche Gold- und Silber-Scheideanstalt vormals Roessler, Germany

[*] Notice: The portion of the term of this patent subsequent to Sept. 9, 1992, has been disclaimed.

[22] Filed: July 27, 1971

[21] Appl. No.: 166,595

[30] Foreign Application Priority Data

May 12, 1971 Germany.............................. 2123535

[52] U.S. Cl............................ 260/236.5; 260/210.5
[51] Int. Cl.²..................... C07G 17/00; C07J 19/00
[58] Field of Search....................... 260/210.5, 236.5

[56] References Cited

UNITED STATES PATENTS

| | | | |
|---|---|---|---|
| 2,224,804 | 12/1940 | Wolf................................. | 260/210.5 |
| 2,312,588 | 3/1943 | Rabald et al...................... | 260/210.5 |
| 2,615,016 | 10/1952 | Schenck et al. ................. | 260/210.5 |
| 3,163,636 | 12/1964 | Wagner et al. .................. | 260/210.5 |

OTHER PUBLICATIONS

Petricic, "Chem. Abst." Vol. 67, 1967, p. 57272C.

Primary Examiner—Johnnie R. Brown
Attorney, Agent, or Firm—Cushman, Darby & Cushman

[57] ABSTRACT

Hellebrin extracts are purified by heating in aliphatic or cycloaliphatic alcohols or cyclic ethers until crystallization occurs.

10 Claims, No Drawings

PROCESS FOR THE RECOVERY OF PURE HELLEBRIN

The present invention is related to that in my application Ser. No. 166,596 (corresponding to German Pat. No. 2,038,110 filed on even date and entitled "Process For the Recovery of Hellebrin." The entire disclosure of the copending application is hereby incorporated by reference.

The heart glycoside can be recovered in pure form from Helleborus types only with considerable difficulty.

Small impurities of other materials lead to a considerable increase in the solubility of hellebrin. In customary procedures preliminarily purified or enriched hellebrin fractions in solutions in the customary solvents even at a high hellebrin content in the dry residue which has been dissolved in the solvent obstinately resist crystallization.

In concentrating such solutions there is formed much more frequently amorphous lacquers.

There has now been discovered a simple process for the recovery of pure hellebrin which consists of taking hellebrin extracts which have been preliminarily purified or enriched by known processes or by adsorption purification of large-grained silica gel (particle size 0.15–10 mm.) as disclosed in said copending application and heating said extracts with aliphatic alcohols (alkanols) or cycloaliphatic alcohols (cycloalkanols) or liquid cyclic ethers until crystallization occurs.

By the process of the invention the hellebrin separates from the initially clear solution after a certain time in crystalline form.

This process is basically different from a normal crystallization which makes use of the different solubility of a material at different temperatures. The normal crystallization consists of a substance being more soluble in the hot than in the cold and that it therefore separates out upon cooling.

On the contrary in the process of the invention it is necessary to heat the hellebrin containing extract for some time with the organic reagent whereby the separation takes place in the hot. The precipitation is not caused by loss of solvent since substantially no solvent is lost during the heating.

The organic solvents used in this invention should be as free as possible from water, for example the water content should not amount to more than 10%. There is used sufficient solvent that the hellebrin extract is completely soluble in the hot. The amount of solvent to be used is suitably determined in a simple special preliminary test.

The solution is then heated until crystals begin to separate from the hot solution. This point in time of the beginning of the separation of crystals is dependent upon the hellebrin content of the extract employed. Hellebrin rich extracts crystallize quicker than hellebrin poor extracts. With very low hellebrin extracts it is recommended to enrich them by known methods to a hellebrin content of 10% or higher.

In general the thus separated hellebrin still contains solvent. This can be removed by subsequent drying, for example at 100°C. in a vacuum. It goes without saying that it is also possible to recrystallize the separated hellebrin again in usual manner, for example from methanol water.

The time until the first separation of crystals of hellebrin for example can be between 5 minutes and 2 hours. It is suitable to heat further for about an additional hour from the time of the first separation of crystals in order to quantitatively complete the separation. The solution can then, for example, be deliberately cooled or the solution can be allowed to cool by standing.

In general it is recommended to heat to a temperature between 50° and 180°C. Especially favorable are temperatures between 70° and 130°C.

As the alcohols used for the heating primarily there are employed saturated aliphatic and cycloaliphatic alcohols, (alkanols and cycloalkanols) especially monohydric alcohols. The number of carbon atoms can for example be between 1 and 8 carbon atoms, in the case of cycloaliphatic alcohols especially between 5 and 8 carbon atoms. Of the aliphatic alcohols those with 1 to 6 carbon atoms are preferred.

As cyclic ethers for example there can be used the saturated cyclic ethers with 5 to 8 members in the ring, especially 5 to 6 ring members and containing one or two oxygen atoms. The oxygen atoms of these ethers must form true ether compounds, i.e. in the case of two oxygen atoms they must be separated by at least two carbon atoms.

It is convenient, if the boiling point of the solvent used is not over 180°C. Preferred are solvents with a boiling point between 50° and 180°C., especially from 70° to 180°c.

Examples of such solvents are methanol, ethanol, propanol, butanol-2, isopropanol, pentanol, hexanol, heptanol, 2-ethylhexanol, cyclopentanol, cyclohexanol, 2-methyl cyclohexanol, dioxane, tetrahydrofuran, tetrahydropyrane, etc.

It is suitable to heat under reflux. Naturally it is also possible to maintain the fixed temperature by other conventional means. Stirring can be employed.

Fundamentally however, there can be employed hellebrin extracts which have been recovered and purified or enriched in known manner. These preliminarily purified hellebrin extracts can be obtained for example by the following methods:

Extraction of activated carbon treated aqueous Helleborus extracts with organic solvents and further purification as in German Pat. No. 605 073. For example the dry activated carbon adsorbate is extracted with equal volumes of chloroform and methyl alcohol, the solvents distilled off, the residue digested with 5 fold the amount of absolute alcohol, filtering and precipitating with 5 fold the volume of ether, and drying.

Precipitation of aqueous Helleborus extracts with lead acetate and subsequent treatment with activated carbon and extraction with an organic solvent, e.g. a 1:1 by volume mixture of methyl alcohol and methylene chloride and evaporating to dryness as in Helv.-Chemica Acta 26 1353–1363 [1943] or Farmacia (Bucharest) 7, 407 (1959).

Chromatographic purification of Helleborus extracts on aluminum oxide (Planta med. 9, 64 (1961).

Chromatographic purification of Helleborus extracts on aluminum oxide with a previous lead precipitation (Med. prom. SS R 18, 12 [1964]).

Chromatography of Helleborus extracts on finely divided silica gel (particle size 0.01–0.04 mm) (Z. Naturforschung 20b, 707 [1965]; Acta Pharm Jug. 17, 29 [1967]; or successive treatment of Helleborus extracts with different solvents (Czechoslovakian Pat. No. 101,577).

Of course combinations of these processes can be employed.

Also suitable are preliminary extracts of defatted Helleborus drugs enriched on silica gel or aluminum oxide columns. Hellebrin fractions obtained by column chromatography are especially suited.

Very good yields are obtained from a hellebrin concentrate which has been obtained by purification of a hellebrin extract on large grained (particle size 0.15–10 mm) silica gel, see my aforementioned application filed on even date.

The hellebrin extract which is to be employed according to the invention should be as dry as possible. At a larger residual water content (for example over 10%) or of a solvent which does not have the effect of the invention, e.g. a halohydrocarbon, aromatic hydrocarbon, aliphatic ketone or the like wherein no crystallization effect according to the invention is noted it is suitable to previously remove the water or residual solvent by known methods or to bring it below 10%.

Unless otherwise indicated all parts and percentages are by weight.

The silica gel used in examples 1 and 2 had a silica gel particle size of 0.15–0.30 mm., Si $O_2$ contain 95–96%, water of constitution 4%, specific surface area about 400 m²/g, pore diameter about 90 Angstroms, specific heat 0.22 cal/g/°C., bulk density 450–500 g/l, true specific weight 2.3, heat of moistening with water 18 cal/g, and pore volume 0.7–0.8 ml/g.

Example 1

20 grams of dried hellebrin extract (hellebrin content 10%) which had been obtained by chromatography on large-grained silica gel (0.15–0.30 mm.) as set forth in my copending application filed on even date was heated at reflux with 100 ml. of n-propanol until crystals began to separate from the initially clear solution. It was heated for 1 more hour. After cooling the crystals were removed by filtering with suction and boiled several times with absolute alcohol. Yield 0.84 gram of hellebrin (42% of theory).

Example 2

100 kg. of dried Helleborus root was pulverized and defatted with petroleum ether. The defatted drug was exhaustively extracted with methanol. The residue of the methanolic extract was dissolved in water and extracted with chloroform-ethanol (2:1 by volume). The chloroform phase was evaporated to an extract material content of about 50%. The concentrate was supplied to a column with 50 kg of the silica gel (particle size 0.15–0.30 mm. It was eluted with chloroform/methanol (90:10 by volume) until hellebrin was detectable in the eluate by thin layer chromatography. Then the main amount of the hellebrin was dissolved from the column with chloroform/methanol (85:15 by volume). The hellebrin rich fractions were united and dried. The residue was heated under reflux with 5 times the amount of absolute alcohol until the hellebrin precipitated out in the form of fine crystals. After cooling the crude hellebrin was filtered off with suction and recrystallized from methanol-water. Yield 198 grams.

What is claimed is:

1. In a process for the recovery of pure hellebrin from a hellebrin extract which has been preliminarily purified or enriched, the improvement consisting essentially of heating at a temperature up to reflux the extract containing not over 10% of water or of a solvent which does not cause precipitation upon heating with an oxygen containing solvent which is an alkanol having 1 to 8 carbon atoms, a cycloalkanol having 5 to 8 carbon atoms or a cyclic ether having 5 to 8 ring atoms including 1 to 2 ring oxygen atoms and the balance of the ring atoms being carbon atoms until the hellebrin first dissolves and continuing said heating until the hellebrin then crystallizes out of the solution without substantial loss of solvent whereby the precipitation as crystals is not caused by loss of solvent.

2. A process according to claim 1 wherein said oxygen containing solvent is an alkanol having 1 to 6 carbon atoms, a cycloalkanol having 5 to 6 carbon atoms in the ring or a cyclic ether having 5 to 6 atoms in the ring, said oxygen containing solvent having a boiling point between 50° and 180°C.

3. A process according to claim 2 wherein the hellebrin extract is in dry form.

4. A process according to claim 3 wherein the hellebrin extract is one obtained from adsorption on activated carbon, silica gel or aluminum oxide.

5. A process according to claim 2 wherein the hellebrin extract is one obtained from adsorption on activated carbon, silica gel or aluminum oxide.

6. A process according to claim 5 wherein the extract employed has at least 10% hellebrin.

7. A process according to claim 1, wherein the heating is carried out at a temperature up to 180°C.

8. A process according to claim 7 wherein the heating is carried out at 70° to 130°C.

9. A process according to claim 1, wherein the adsorbent is activated carbon.

10. A process according to claim 1 wherein the adsorbent is aluminum oxide.

* * * * *